(12) United States Patent
Kakimoto et al.

(10) Patent No.: US 10,889,074 B2
(45) Date of Patent: Jan. 12, 2021

(54) FIBER REINFORCED COMPOSITE MATERIAL MOLDING AND MANUFACTURING METHOD THEREFOR

(71) Applicant: Mitsubishi Rayon Co., Ltd., Chiyoda-ku, Tokyo (JP)

(72) Inventors: Yoshihide Kakimoto, Toyohashi (JP); Kazuhisa Ikeda, Toyohashi (JP); Kouichi Akiyama, Toyohashi (JP); Mitsuru Kutsuwada, Toyohashi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 130 days.

(21) Appl. No.: 15/117,761

(22) PCT Filed: Feb. 19, 2015

(86) PCT No.: PCT/JP2015/054576
§ 371 (c)(1),
(2) Date: Aug. 10, 2016

(87) PCT Pub. No.: WO2015/125854
PCT Pub. Date: Aug. 27, 2015

(65) Prior Publication Data
US 2016/0354983 A1 Dec. 8, 2016

(30) Foreign Application Priority Data
Feb. 19, 2014 (JP) .................................. 2014-029368

(51) Int. Cl.
*B29C 70/34* (2006.01)
*B29C 70/84* (2006.01)
(Continued)

(52) U.S. Cl.
CPC ............ *B29C 70/345* (2013.01); *B29B 11/12* (2013.01); *B29B 11/16* (2013.01);
(Continued)

(58) Field of Classification Search
CPC ......... B29C 44/1228–1233; B29C 70/34–345; B29C 44/1219; B29C 44/1209; B29B 11/16
See application file for complete search history.

(56) References Cited

U.S. PATENT DOCUMENTS 5,660,901 A * 8/1997 Wong .................... B29B 15/122
156/199
6,323,251 B1 * 11/2001 Perez ....................... B41M 1/04
428/343
(Continued)

FOREIGN PATENT DOCUMENTS

EP 2 345 529 A1 7/2011
EP 2345529 A1 * 7/2011 ............. B29C 70/34
(Continued)

OTHER PUBLICATIONS

International Search Report dated May 12, 2015 for International application No. PCT/JP2015/054576.
(Continued)

*Primary Examiner* — Alex A Rolland
(74) *Attorney, Agent, or Firm* — Morgan, Lewis & Bockius LLP

(57) ABSTRACT

The present invention relates to a method for manufacturing a fiber-reinforced composite material molding, having a step (A) for forming a plurality of partial preforms, each having a partial shape obtained by dividing the three-dimensional shape of a target fiber-reinforced composite material molding, by cutting a prepreg sheet containing reinforcing fibers and a matrix resin composition, and by preshaping the cut prepreg pieces; a step (B) for forming a preform having the three-dimensional shape of the target fiber-reinforced composite material molding by combining and integrating the plurality of partial preforms; and a step (C) for producing a fiber-reinforced composite material molding by compres-
(Continued)

sion-molding the preform, wherein the step (B) includes arranging a foamable material between the plurality of partial preforms when they are combined.

12 Claims, 13 Drawing Sheets

(51) Int. Cl.
*B29B 11/16* (2006.01)
*B29C 69/00* (2006.01)
*B29B 11/12* (2006.01)
*B29C 44/12* (2006.01)
*B29C 43/20* (2006.01)
*B29C 43/18* (2006.01)
*B29K 63/00* (2006.01)
*B29K 105/04* (2006.01)
*B29K 105/08* (2006.01)
*B29L 9/00* (2006.01)

(52) U.S. Cl.
CPC ........ *B29C 44/1233* (2013.01); *B29C 69/001* (2013.01); *B29C 70/84* (2013.01); *B29C 43/18* (2013.01); *B29C 43/20* (2013.01); *B29K 2063/00* (2013.01); *B29K 2105/04* (2013.01); *B29K 2105/0881* (2013.01); *B29L 2009/00* (2013.01)

(56) References Cited

U.S. PATENT DOCUMENTS

| | | |
|---|---|---|
| 8,263,205 B2 | 9/2012 | Kweder |
| 2011/0064908 A1* | 3/2011 | Kweder .................. B29B 11/16 428/113 |
| 2015/0209982 A1 | 7/2015 | Kutsuwada et al. |

FOREIGN PATENT DOCUMENTS

| | | |
|---|---|---|
| FR | 2831479 A1 | 5/2003 |
| JP | U61-115624 A | 7/1986 |
| JP | 2000-109627 A | 4/2000 |
| JP | 2008-290421 A | 12/2008 |
| JP | 2009-285957 A | 12/2009 |
| JP | 2011-031481 A | 2/2011 |
| JP | 2013-505151 A | 2/2013 |
| JP | 2014-024334 A | 2/2014 |
| JP | 5757338 B2 | 7/2015 |
| WO | 2010/023140 A1 | 3/2010 |
| WO | 2011/034684 A1 | 3/2011 |

OTHER PUBLICATIONS

Office Action dated Jan. 5, 2016 for corresponding Japanese Patent application No. 2015-512415.
Extended European Search Report dated Feb. 20, 2017, for corresponding European Patent Application No. 15751474.6.
EPO Communication dated Jul. 5, 2019 in corresponding EP Application No. 15 751 474.6 (three pages—in English).
Communication issued in European Patent Application No. 15 751 474.6-1014, dated Feb. 17, 2020.

* cited by examiner

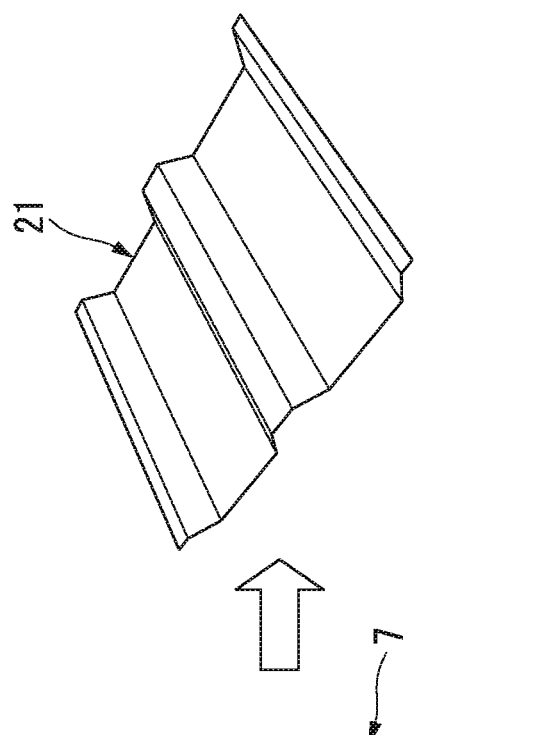
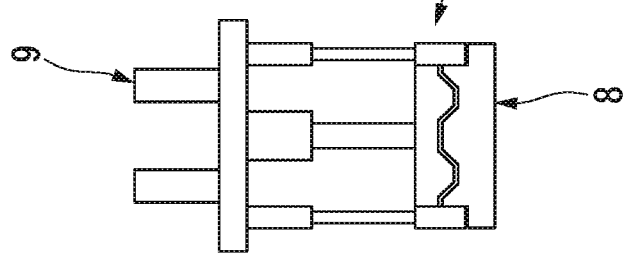
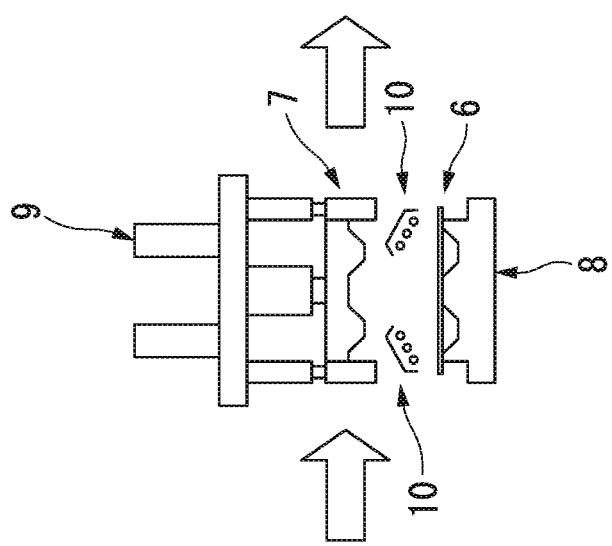
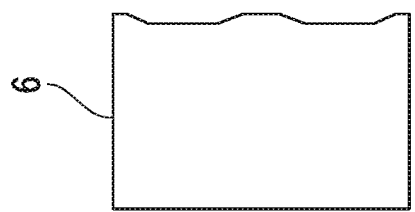

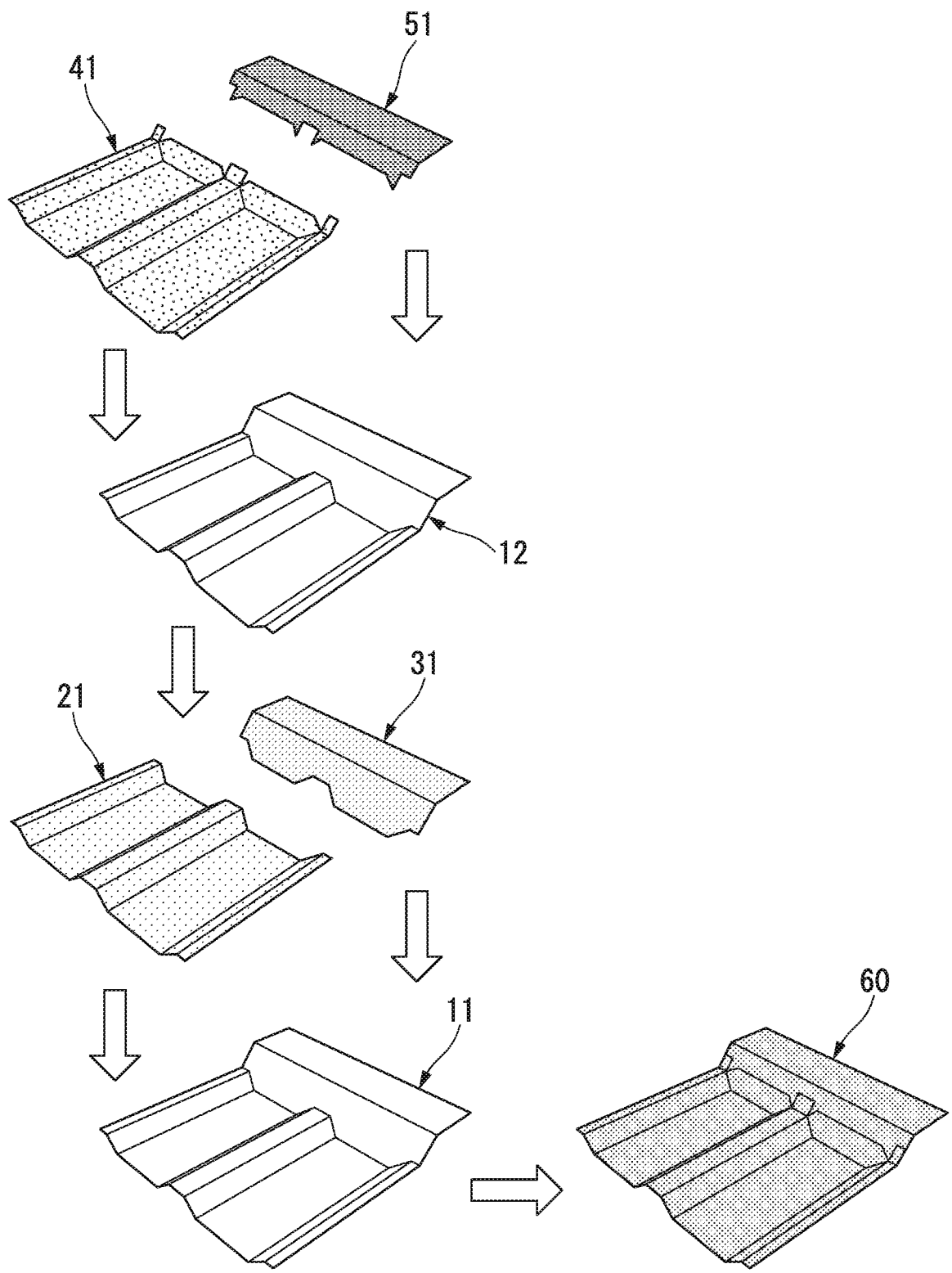
*FIG. 7A*  *FIG. 7B*

FIBER REINFORCED COMPOSITE MATERIAL MOLDING AND MANUFACTURING METHOD THEREFOR

TECHNICAL FIELD

The present invention relates to a method for manufacturing a fiber-reinforced composite material molding having a desired three-dimensional shape; in such a method, a preform is prepared by preshaping a prepreg sheet prior to forming the final shape of the product. The present invention also relates to a fiber-reinforced composite material molding produced by such a manufacturing method.

BACKGROUND ART

Patent Literature 1 discloses a method for forming various types of cut pieces having desired shapes by preparing a laminate, which is formed with sheets of UD prepreg (unidirectional prepreg) each made to extend in one fiber orientation and layered at different fiber orientation angles, and by cutting the laminate. Moreover, Patent Literature 1 discloses a method for manufacturing a molded product by combining the above cut pieces into a three-dimensional preform, and by compression-molding the preform.

However, when the production method of Patent Literature 1 is employed to structure a three-dimensional preform by combining cut pieces, a gap may result between the combined cut pieces. If a preform having a gap between cut pieces is compression-molded under conditions of higher pressure, an excess amount of prepreg may flow into the gap, thus causing the fibers to meander. On the other hand, if lower pressure is applied during the compression-molding process, pressure on the gap may be insufficient, thus causing voids. Moreover, depending on compression-molding conditions, both fiber meandering and voids may occur, and the physical properties of the molded product are thereby diminished.

To prevent the aforementioned problems, it is necessary for a preform not to have any gap between cut pieces. However, to structure a preform without causing gaps, conventional production methods may face problems such as a markedly longer time, which accordingly causes significantly diminished work efficiency.

In addition, cut pieces disclosed in Patent Literature 1 are designed in such a way that end faces of prepreg laminates overlap in a thickness direction of the laminate when a preform is produced. Namely, the thickness of a preform formed by combining cut pieces is uneven in parts. Thus, when a preform is molded, the clearance (gap) of the die is adjusted so as to correspond to a variation in the thickness of a preform.

However, if the thickness of prepreg varies, the die clearance may not correspond to the thickness of a preform. Accordingly, molding defects may occur in parts of the molded product. Namely, using the production method described in Patent Literature 1, it is difficult to maintain consistent quality in the molded products.

Patent Literature 2 describes a fiber-reinforced resin-containing sandwich plate that is lightweight and rigid. An aspect of the literature is a method for forming a foam-core sandwich plate structured to have a foamable resin core material containing a foaming agent sandwiched by surface materials containing prepreg. Its main objective is to provide lightweight rigid plate products by manufacturing reasonably priced high-performance core sandwich plates. However, there is no mention of or suggestion for the technical concept, for example, of using foamable material to compensate for molding defects that may occur during molding procedures.

Patent Literature 3 discloses a method for manufacturing a molded product; when a molded product is manufactured using three-dimensional prepreg laminates in the method, prepreg pieces are set to abut each other and are sewed so as to prevent the prepreg pieces from separating during compression-molding procedures. However, the technical concept, for example, of using foamable material to avoid molding defects during molding procedures is not mentioned or suggested.

PRIOR ART LITERATURE

Patent Literature

Patent Literature 1: specification of U.S. Pat. No. 8,263,205
Patent Literature 2: JP2009-285957A
Patent Literature 3: JP2008-290421A

SUMMARY OF THE INVENTION

Problems to be Solved by the Invention

The present invention was carried out in consideration of the aforementioned problems. Its objective is, for manufacturing a fiber-reinforced composite material molding, to provide a method capable of achieving excellent physical properties in compression-molded products of three-dimensional preforms and of maintaining consistent quality in molded products. Also, its objective is to provide fiber-reinforced composite material moldings manufactured by such a method.

Solutions to the Problems

The present invention has the following aspects.

[1] A method for manufacturing a fiber-reinforced composite material molding, including the following steps: step (A) for forming multiple partial preforms, each having a partial shape obtained by dividing the three-dimensional shape of a target fiber-reinforced composite material molding, by cutting a prepreg sheet containing reinforcing fibers and a matrix resin composition, and by preshaping the cut prepreg pieces; step (B) for forming a preform having the three-dimensional shape of the target fiber-reinforced composite material molding by combining and integrating the multiple partial preforms; and step (C) for producing a fiber-reinforced composite material molding by compression-molding the preform. In such a manufacturing method, step (B) includes arranging foamable material between multiple partial preforms when they are combined.

[2] The method for manufacturing a fiber-reinforced composite material molding described in [1], in which a partial preform is obtained by layering multiple pieces of the cut prepreg to form a laminate and by preshaping the laminate.

[3] The method for manufacturing a fiber-reinforced composite material molding described in [1], in which the foamable material is a foamable resin film.

[4] The method for manufacturing a fiber-reinforced composite material molding described in [2], in which the foamable material is a foamable resin film.

[5] The method for manufacturing a fiber-reinforced composite material molding described in any of [1] to [4], in which step (B) includes a step for combining the multiple partial preforms by setting their end faces to abut each other.

[6] The method for manufacturing a fiber-reinforced composite material molding described in any of [1] to [4], in which step (B) includes a step for combining the multiple partial preforms by setting their edges to overlap each other.

[7] The method for manufacturing a fiber-reinforced composite material molding described in [6], in which step (B) includes a step for combining the multiple partial preforms by setting their edges to overlap each other with the foamable material placed in between.

[8] The method for manufacturing a fiber-reinforced composite material molding described in any of [3] to [7], in which the foamable resin film has properties to foam up when heated.

[9] The method for manufacturing a fiber-reinforced composite material molding described in any of [3] to [7], in which the foamable resin film has properties to foam up through chemical reactions.

[10] The method for manufacturing a fiber-reinforced composite material molding described in any of [3] to [9], in which the foamable resin contained in the foamable resin film includes an epoxy resin composition.

[11] The method for manufacturing a fiber-reinforced composite material molding described in any of [3] to [10], in which the thickness of the foamable resin film is 0.01 to 10.0 mm.

[12] The method for manufacturing a fiber-reinforced composite material molding described in [11], in which the thickness of the foamable resin film is 0.2 to 5.0 mm.

[13] The method for manufacturing a fiber-reinforced composite material molding described in any of [1] to [12], in which the multiple partial preforms contain multiple groups of partial preforms, and the multiple groups of partial preforms are those divided by different dividing-line patterns.

[14] A fiber-reinforced composite material molding produced by a method for manufacturing a fiber-reinforced composite material molding described in any of [1] to [13], in which a foamed body is arranged in at least a portion between the multiple partial preforms.

Effects of the Invention

Using the method for manufacturing fiber-reinforced composite material moldings according to an embodiment of the present invention, compression-molded products made of three-dimensional preforms exhibit excellent physical properties, and consistent quality of the molded products is maintained.

BRIEF DESCRIPTION OF THE DRAWINGS

FIGS. 6A-6D are views showing processing steps for preshaping a cut prepreg piece or a laminate in the embodiment of the present invention;

FIGS. 7A and &B are views showing processing steps for combining partial preforms in the embodiment of the present invention;

MODE TO CARRY OUT THE INVENTION

Figure 1:
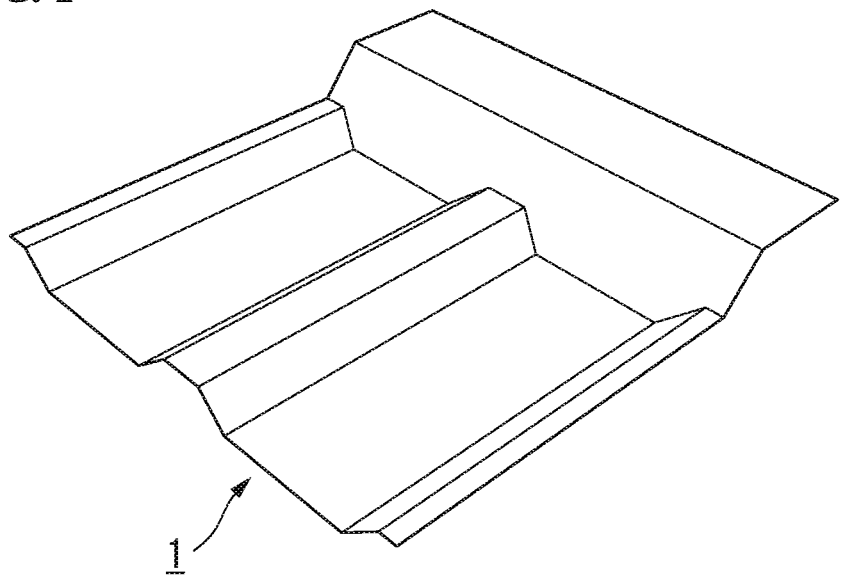
FIG. 1 is a perspective view showing a molded product according to an embodiment of the present invention.

An aspect of the present invention is a method for manufacturing a fiber-reinforced composite material molding, and includes the following steps: step (A) for forming multiple partial preforms, each having a partial shape obtained by dividing the three-dimensional shape of a target fiber-reinforced composite material molding, by cutting a prepreg sheet containing reinforcing fibers and a matrix resin composition, and by preshaping the cut prepreg pieces; step (B) for forming a preform having the three-dimensional shape of the target fiber-reinforced composite material molding by combining and integrating the multiple partial preforms; and step (C) for producing a fiber-reinforced composite material molding by compression-molding the preform. In such a manufacturing method, step (B) includes arranging a foamable material between multiple partial preforms when they are combined.

In addition, another aspect of the present invention is a fiber-reinforced composite material molding obtained by the above method for manufacturing a fiber-reinforced composite material molding. In the following, the present invention is described in detail.

<Method for Manufacturing Fiber-Reinforced Composite Material Molding>

[Step (A)]

In step (A) of an embodiment of the method for manufacturing a fiber-reinforced composite material molding related to the present invention, a prepreg sheet containing reinforcing fibers and a matrix resin composition is cut into pieces, and the cut pieces are preshaped so that multiple partial preforms are formed into shapes obtained by dividing the three-dimensional shape of a target molded product of reinforced-fiber composite material.

(Prepreg Sheet)

A prepreg sheet used in the method for manufacturing a fiber-reinforced composite material molding according to an embodiment of the present invention contains reinforcing fiber and a matrix resin composition.

The prepreg may be UD prepreg where reinforcing fibers are uni-directionally aligned, or may be cloth prepreg where reinforcing fibers are woven. Alternatively, prepreg may be a so-called non-crimp fabric (NCF) formed with multiple fiber reinforcing sheets, where multiple unidirectional fiber-reinforcing sheets are set to overlap in different fiber directions from each other and are integrated using auxiliary fibers.

The thickness of the prepreg sheet is preferred to be 0.1 mm to 5.0 mm, more preferably 0.4 mm to 2.0 mm. A prepreg thickness of less than 0.1 mm is too thin to maintain the shape of a partial preform, whereas a prepreg thickness exceeding 5.0 mm is too thick to form a shape, and wrinkles may result in such a shape. Namely, a prepreg thickness of 0.1 mm to 5.0 mm is preferred, since it is easier to maintain the shape of a partial preform and the shaped preform is less likely to have wrinkles. In addition, as described later, when a laminate formed by layering multiple cut prepreg pieces is used for a partial preform, the prepreg thickness is preferred to be 0.03 to 1 mm, more preferably 0.1 to 0.5 mm. The thickness of the prepreg is measured by using an outside micrometer or paper micrometer.

Also, the size of the prepreg sheet is, for example, 0.1 to 2 m wide and 0.1 to 200 m long.

(Reinforcing Fiber)

In a method for manufacturing fiber-reinforced composite material molding according to an embodiment of the present invention, examples of reinforcing fibers to be used are carbon fibers, glass fibers, aramid fibers, high-strength polyester fibers, boron fibers, alumina fibers, silicon nitride fibers, nylon fibers and the like. Among them, carbon fibers are preferred because of their excellent specific strength and specific elasticity.

In an embodiment of the present invention, the content of reinforcing fibers in a prepreg is preferred to be 50 to 80 mass %, more preferably 65 to 75 mass %, relative to the total mass of the prepreg.

(Matrix Resin Composition)

In a method for manufacturing a fiber-reinforced composite material molding according to an embodiment of the present invention, examples of a matrix resin composition to be used are epoxy resins, unsaturated polyester resins, acrylic resins, vinyl ester resins, phenol resins, benzoxazine resins and the like. Among them, epoxy resins are preferred because strength is enhanced after the resin is cured.

Also, the prepreg may contain various additives such as follows: curing agents corresponding to the above respective resins (epoxy-resin curing agents such as amine compounds for epoxy resin), internal mold-release agents such as stearic acid salts, defoamers such as silicone oil, UV absorbers such as benzophenone compounds and benzotriazole compounds, fillers such as carbon black, fine particles of calcium carbonate and aluminum hydroxide, and so forth.

(Partial Preform)

In an embodiment of the present invention, a partial preform has a partial shape obtained by dividing the three-dimensional shape of a target fiber-reinforced composite material molding. In addition, a partial preform is for forming a preform by employing step (B) of the present invention. A partial preform having a partial shape is obtained by cutting a prepreg sheet into pieces and preshaping a cut piece. A partial preform may also be obtained by layering multiple cut prepreg pieces to form a laminate, which is then preshaped. In such an embodiment of the present invention, a partial preform is made of a laminate where multiple cut prepreg pieces are layered.

A method for forming such a partial preform is as follows:
(1) from the three-dimensional shape of a target fiber-reinforced composite material molding, determine a partial shape through simulation;
(2) determine a planar shape from the partial shape;
(3) cut a prepreg sheet according to the planar shape so as to obtain a cut prepreg piece;
(4) if applicable, form a laminate by layering multiple cut prepreg pieces; and
(5) obtain a partial preform by preshaping the cut prepreg piece or the laminate.

A partial preform is preferred to be made of a laminate obtained by layering multiple cut prepreg pieces and formed into a preshape, because such a preform is capable of enhancing the strength of a finished product of fiber-reinforced composite material.

((1) Determining Partial Shape)

From the three-dimensional structure of a target fiber-reinforced composite material molding, a partial shape is determined through simulation. A partial shape is determined so as not to cause difficulties when a partial preform is obtained by preshaping a cut prepreg piece or a laminate obtained by layering multiple cut prepreg pieces. Here, regarding cut lines of multiple partial shapes determined through simulation from the three-dimensional structure of a target fiber-reinforced composite material molding, those cut lines are defined as "dividing lines," and their patterns as "dividing-line patterns."

More specifically, if the aforementioned cut prepreg piece or laminate is preshaped through slight elongation or contraction (hereinafter such a deformation is referred to as "shearing deformation"), it can be used as a partial shape related to an embodiment of the present invention. However, to make it easier to form a subsequent preshape, it is more preferred to use such a shape that can be preshaped only through bending or curving without employing a shearing deformation procedure.

The size of a partial shape is not particularly limited as long as the aforementioned shearing deformation is easier to employ. In addition, partial shapes are preferred to be determined so that a structure, obtained when all partial shapes are combined, is identical to the three-dimensional shape of a target fiber-reinforced composite material molding. In the present application, "having a shape" or "an identical shape" means, when compression-molding in step (C), for example, is conducted, a shape can be molded into a structure having the shape and dimensions (excluding the plate thickness of a molded product) identical to those of a fiber-reinforced composite material molding; or a shape is identical to the shape and dimensions (excluding the plate thickness of a molded product) of a molded product of fiber-reinforced composite material. Namely, having a shape or an identical shape means the size and dimensions (excluding the plate thickness of a molded product) are approximately those of a molded product, or the size and dimensions (excluding the plate thickness of a molded product) are identical to those of a molded product.

Therefore, when multiple partial shapes are determined through simulation from the three-dimensional shape of a target fiber-reinforced composite material molding, their integrated structure is approximately identical to the three-dimensional shape of the intended fiber-reinforced composite material molding. If multiple partial shapes can be fabricated into a target fiber-reinforced composite material molding when combined, then a set of those multiple partial shapes is referred to as a "group of partial shapes". Namely, a group of partial shapes means a collection of multiple partial shapes divided by a set of dividing-line patterns. In addition, a collection of partial preforms produced using a group of cut prepreg pieces or their laminates that are cut into respective shapes is referred to as a "group of partial preforms". In the above, one method for determining partial shapes was described; however, a group of partial shapes or a group of partial preforms may consist of those obtained by cutting part or all of the shapes along different dividing-line patterns. In such a case, multiple groups of partial shapes cut along different dividing-line patterns are preferred to be designed in such a way that their divided lines will not align on the same lines in a thickness direction when multiple groups of partial preforms are layered. In other words, when multiple different dividing-line patterns are designed, their dividing lines are preferred to be arranged not to align on the same lines in a thickness direction when multiple partial preforms are respectively produced from the partial shapes and are layered.

When partial shapes are determined as above, even if fibers of a molded product are cut at the edge of a particular partial preform, stress is dispersed and transmitted to another partial preform layered thereon. Accordingly, the strength of the molded product is prevented from being reduced.

((2) Determining Planar Shape from Partial Shape)

A planar shape means a shape that can be preshaped into the above partial shape. When a partial shape is in a three-dimensional structure, a planar shape is obtained by developing the three-dimensional structure on a plane. Namely, a planar shape is the shape of a cut prepreg piece or its laminate prior to being formed into a preshape. An example of how to determine a planar shape is as follows: using a die having the same shape as the partial shape, manually preshape a prepreg sheet or its laminate cut larger in advance, and trim the peripheral portion so as to obtain a preshape having a desired partial shape; remove the preshape from the die, and stretch it into a two-dimensional shape; and scan the shape or measure its peripheral shape by a three-dimensional shape-measuring device.

If three-dimensional CAD data of the shape of a molded product are available, the data of a target partial shape are extracted from the three-dimensional CAD data and its planar shape is determined by using a software (for example, product name: FiberSim, made by Siemens PLM Software) capable of producing planar shape data developed from the data of the partial shape. A planar shape is preferred to be determined by using software because the accuracy of the planar shape is enhanced.

((3) Cutting Prepreg Sheet According to Planar Shape)

Examples of a method for cutting a prepreg sheet into the aforementioned target planar shape are: cutting by scissors; cutting using a cutting plotter if two-dimensional CAD data are available; and so forth. Using a cutting plotter is preferred since the accuracy of a cut shape is enhanced.

((4) Laminating Cut Prepreg)

Next, when a laminate made of multiple prepreg sheets is used for a later-described partial preform, cut prepreg pieces are layered to form a desired laminate structure. As long as the effects of the present invention are achieved, the laminate structure is not limited to any particular type and may be unidirectional laminates, orthogonally crossed laminates, quasi-isotropic laminates and the like. An orthogonally crossed laminate is preferred because shearing deformation is made easier. In addition, the number of prepreg sheets to form a laminate may be set at 2 to 20, preferably 2 to 10, especially preferably 3 to 7.

The thickness of a laminate is preferred to be 0.1 mm to 5.0 mm, more preferably 0.4 mm to 2.0 mm. A laminate thickness of less than 0.1 mm is too thin, thereby making it hard to maintain the shape of a partial preform to be obtained. Moreover, such a thickness results in an increase in the number of partial preforms and in the number of lamination procedures required to form an intended fiber-reinforced composite material molding. Accordingly, production efficiency is lowered. On the other hand, a laminate thickness exceeding 5.0 mm is too thick to be formed into a shape, likely causing wrinkles or the like in the obtained preshape. Namely, a laminate thickness of 0.1 mm to 5.0 mm is preferred since such a thickness range makes it easier to maintain the shape of a partial preform, enhance the efficiency of lamination procedures, and lower the occurrence of wrinkles and the like in the preshape. The aforementioned methods to measure a prepreg thickness may also be employed for measuring the thickness of a laminate.

((5) Preshaping Cut Prepreg Piece or Laminate)

A partial preform is obtained by preshaping the cut prepreg piece or laminate using a desired method. Namely, "to preshape" in the present application means to change a planar cut prepreg piece or a laminate to a partial shape, including a three-dimensional partial shape, that is determined through simulation from the three-dimensional structure of a target fiber-reinforced composite material molding.

To obtain a partial preform, for example, a cut prepreg piece or laminate may be preshaped by manually pressing it onto a mold. It is also an option to preshape a cut prepreg piece or laminate by arranging the cut piece or laminate in a mold, a rubber film or the like is placed thereon, and by evacuating the inner air so that the rubber film is adhered to the cut piece or laminate. It is yet another option to arrange male and female dies in a simple molding machine and to compress a cut prepreg piece or a laminate into a preshape. Among those methods, a cut prepreg piece or a laminate is preferred to be preshaped by compression using male and female dies because such a method is capable of forming a preshape in a shorter period of time even if it is a larger shape.

In addition, regarding multiple partial preforms having partial shapes obtained by dividing the three-dimensional structure of a target fiber-reinforced composite material molding, all the preforms may be the same, only some may have the same shape, or all the preforms may be different. In one embodiment, all the multiple partial preforms are of the same shape. In another embodiment, some of the multiple partial preforms are of the same shape. In yet another embodiment, all the multiple partial preforms are of a different shape. In yet another embodiment, not all the multiple partial preforms are of the same shape.

Moreover, it is preferred to set multiple simple molding machines to work at the same time, because various types of partial preforms are produced at the same time so as to significantly shorten the manufacturing process time.

[Step (B)]

In an embodiment of the present invention, step (B) is conducted to produce a preform having the three-dimensional shape of a target fiber-reinforced composite material molding by combining and integrating multiple partial preforms obtained in step (A). In addition, step (B) is characterized by arranging foamable material between the multiple partial preforms or a group of partial preforms.

In an embodiment of the present invention, when a group of partial preforms and another group of partial preforms divided by different dividing-line patterns are combined and integrated, foamable material is arranged between those groups of partial preforms.

(Foamable Material)

In an embodiment of a method for manufacturing a fiber-reinforced composite material molding according to the present invention, foamable material contains, for example, a resin having foaming properties (hereinafter may be referred to as a "foamable resin"). Examples are a film made from a foamable resin (hereinafter may also be referred to as "foamable resin film" or "foamable film"). Such material may become a foamed body when it foams up, or when a coated foamable resin foams up, or when a mass of foamable resin foams up. The foamable material is preferred to have a desired foaming expansion ratio at a desired temperature. Also, it is preferred to be curable at the curing temperature of the prepreg. Here, "desired temperature" indicates the temperature of a die for compression-molding preforms, in particular, 120 to 160° C.

Because of its film shape, it is easier to obtain a preform by arranging a foamable film between the partial preforms. Thus, using a foamable film is especially preferred, since production efficiency is enhanced. Alternatively, to directly coat a foamable resin, the foamable resin may be coated on one surface of a partial preform or a group of partial preforms, and another partial preform or another group of preforms may be layered on the surface coated with foamable resin to obtain a preform. Yet alternatively, if a mass of foamable resin is used, it is an option to arrange a resin mass between partial preforms or groups of partial preforms, which are then compressed so as to spread the resin mass between the preforms. Then, another partial preform or another group of partial preforms may be layered thereon to obtain a preform. It is also another option to arrange a foamable resin mass between partial preforms or groups of partial preforms, on which another partial preform or another group of partial preforms is layered and compressed. Accordingly, the foamable resin mass is spread and a preform is obtained. When a foamable resin mass is arranged between partial preforms or groups of partial preforms, the foamable resin mass may be divided into a smaller sizes, which are then arranged at equal intervals or at random intervals. In addition, a foamable resin mass is preferred to have a hardness that can be spread when compressed, for example, preferably at a viscosity of 1 to 1000 Pa·s.

In addition, foamable material in the present invention is necessary to have an appropriate volume expansion ratio so that the foamable material fills gaps between partial preforms in the preform to prevent meandering of reinforcing fibers and occurrence of voids. A volume expansion ratio is preferred to be 1.1 to 20 times the initial volume, more preferably 1.5 to 15 times the initial volume, even more preferably 2 to 10 times the initial volume, at the aforementioned desired temperature range. A volume expansion ratio is obtained when the expanded volume is divided by the volume prior to foaming when foamable material foams up under conditions of normal pressure and a desired temperature. Volumes of foamable material before and after foaming are obtained when the foamable material is sunk in a liquid at room temperature and measuring the change in the liquid volume.

(Foamable Resin)

In an embodiment of the present invention, the foamable resin is preferred to be a resin composition containing thermosetting resin and a foaming agent. Examples of a thermosetting resin are epoxy resins, unsaturated polyester resins, acrylic resins, vinyl ester resins, phenol resins, benzoxazine resins and the like. Those thermosetting resins may be used alone or in combination thereof. Among them, an epoxy resin composition containing epoxy resin as a main component is preferred since it is capable of enhancing the strength of a foamed body. Here, a "main component" means that a component is contained at 50 mass % or greater relative to the total mass of the resin composition. In addition, the resin component in the resin composition of the prepreg sheet and the resin component in the resin composition of the foamable material may be the same or different. However, those resin compositions are preferred to contain the same resin as the main component because adhesive strength is enhanced between the prepreg and foamable material.

(Foaming Agent)

A foaming agent is not limited to any specific type as long as the effects of the present invention are achieved; examples are heating-type foaming agents such as sodium bicarbonates, azo compounds, nitroso compounds and hydrazine derivatives; or thermally expandable microcapsules formed by wrapping a low boiling hydrocarbon such as isopentane with thermoplastic resin microcapsules. Among them, thermally expandable microcapsules are preferred from the viewpoint of moldability.

(Method for Foaming Foamable Material)

To foam up a foamable material containing a foamable resin with a heat-foamable foaming agent, a heat-foaming method is preferred to be employed so that heat is applied to the decomposing temperature of the foaming agent. Alternatively, a chemical foaming method may also be employed to cause chemical reactions so that gases such as carbon dioxide are generated. Yet alternatively, if a foamable resin contains thermally expandable microcapsules, it is preferred to apply heat to the softening temperature of the thermoplastic resin contained in the microcapsules.

If the foamable material is a foamable film, the foaming expansion ratio of the foamable material is preferred to be set at 1.0 to 10 times the initial volume, more preferably 1.0 to 5.0 times the initial volume, in a thickness direction of the foamable film. A foaming expansion ratio of smaller than 1.0 is unable to yield the aforementioned effects of foaming. If a foaming expansion ratio exceeds 10 times the initial volume, reinforcing fibers in the prepreg are bent during molding, and the strength of the final molded product may be reduced. Namely, a foaming expansion ratio of the above range is preferred, since the foamed body fills up the gaps between partial preforms, thereby preventing meandering of reinforcing fibers and occurrence of voids, while preventing a reduction in the strength of the final molded product. Such a preferable foaming expansion ratio also applies when a foamable resin is coated, or when a foamable resin mass is used.

The foaming expansion ratio of foamable material indicates a change in the thickness of the foamable material before and after a preform is compression-molded. If a foamable film is used, the foaming expansion ratio is obtained when the thickness of a foamable film after molding, namely, the thickness of the foamed body, is divided by the thickness of the foamable film before molding. The thickness of the foamed body may be obtained by subtracting only the thickness of the prepreg, which is contained in a measured portion of a molded product having a foamable film and is compression-molded under the same measuring conditions, from the thickness of the molded product containing a foamable film. The thickness of a foamed body may also be measured by cutting a molded product containing the foamed body to obtain a cross section using a diamond cutter and by observing the cross section with an optical microscope (such as Microscope VHX-100, made by Keyence). When a foamable resin is coated, the foaming expansion ratio may also be obtained as above when the thickness of a foamed body is divided by the thickness of the foamable resin before molding. Alternatively, if a foamable resin mass is used, the foaming expansion ratio may also be obtained as above when the thickness of a foamed body is divided by the thickness of the foamable resin before molding (the thickness of a foamable resin when a foamable resin mass is arranged between partial preforms or between groups of partial preforms, and is compressed so that the foamable resin is well spread between the partial preforms or between groups of partial preforms).

(Method for Manufacturing Foamable Material)

In an embodiment of the present invention, a foamable film is formed when heat is applied on the aforementioned resin composition containing a thermosetting resin and forming agent to a temperature that will not cause foaming or curing, and then the composition is formed into a film by using a coater. The thickness of such a foamable film is preferred to be 0.01 mm to 10.0 mm, more preferably 0.2 mm to 5.0 mm. If the thickness of a foamable film is less than 0.01 mm, it is too thin and the ease of handling the film is lowered, whereas if the thickness exceeds 10.0 mm, the thickness of a foamable film relative to that of a laminate is too great, likely causing a reduction in the strength of the final molded product. Namely, a thickness of a foamable film in the above range is preferred, since the strength of a final molded product is not lowered and the ease of handling the foamable film is excellent.

When a foamable resin is coated as a foamable material, the aforementioned resin composition is heated to a temperature that does not cause the composition to foam up or cure, and then the composition may be directly coated on a partial preform using a pallet, spatula or brush, or the composition may be discharged and coated on a partial preform using a discharge device such as a cartridge gun. A foamable resin is preferred to be coated to a thickness of 0.01 mm to 10.0 mm, more preferably 0.2 mm to 5.0 mm. If the thickness of a coated foamable resin is less than 0.01 mm, it is too thin, and the effects of the present invention are hard to achieve, whereas if it exceeds 10.0 mm, the thickness of a coated foamable resin relative to that of a laminate is too great and the strength of the final molded product may thereby be lowered. Namely, a thickness of a coated foamable resin in the above range is preferred, since the strength of a final molded product is not lowered and the effects of the present invention are sufficiently achieved.

When a foamable resin mass is used as a foamable material, the aforementioned resin composition is arranged between partial preforms or between groups of partial preforms, heat is applied to a temperature that does not cause the composition to foam up or cure, and the resin mass is spread manually. Alternatively, it is an option to spread a foamable resin mass by arranging it between partial preforms or groups of partial preforms on a mold, placing a rubber film or the like on the preforms, and evacuating the inner air so that the rubber film is adhered to the preforms. The thickness of a spread foamable resin is preferred to be 0.01 mm to 10.0 mm, more preferably 0.2 mm to 5.0 mm. If the thickness of a compressed foamable resin is less than 0.01 mm, it is too thin, and the effects of the present invention are hard to achieve, whereas if it exceeds 10.0 mm, the thickness of a compressed foamable resin relative to that of a laminate is too great, and the strength of the final molded product is likely to be reduced. Namely, a thickness of a compressed foamable resin in the above range is preferred, since the strength of a final molded product is not reduced and the effects of the present invention are sufficiently achieved.

(Preshaping Foamable Resin Film)

Moreover, in an embodiment of the present invention, a foamable film is preferred to be formed into a desired preshape, considering that the film is later combined with a partial preform.

A foamable film may be formed into a preshape by manually or mechanically pressing the film onto a mold, or by arranging a rubber film or the like on a foamable film in a mold and by evacuating the inner air so that the rubber film is adhered to the foamable film. Alternatively, it is an option to arrange male and female dies in a simple molding machine so that a foamable film is compressed into a preshape by those dies.

(Preform)

In a method for manufacturing a fiber-reinforced composite material molding related to the present invention, a preform has a three-dimensional shape of the intended product of a fiber-reinforced composite material. Multiple such preforms are combined with a foamable material and integrated into a final molded product.

When partial preforms are combined, if some of the partial preforms are chipped, or if edges of partial preforms adjacent to each other in a direction perpendicular to a thickness direction significantly overlap or cause a significant gap between them, the preform has portions with uneven thicknesses. Accordingly, when pressure is exerted on the preform to form a final molded product, the pressure on the portions will be uneven, causing reinforcing fibers to meander. As a result, the strength of the molded product is significantly lowered. Therefore, partial preforms are preferred to be combined so as to prevent such problems.

In a method for combining partial preforms according to an embodiment of the present invention, multiple partial preforms may be combined so that their end faces abut each other or their edges overlap.

In an embodiment of the present invention, to arrange a foamable material on partial preforms, it is an option to insert a foamable material between partial preforms or between groups of partial preforms so that the foamable material is spread on the entire preform. At that time, groups of partial preforms are preferred to be those divided by different dividing-line patterns, and dividing lines of a group of partial preforms are preferred not to align on the same dividing lines of another group of partial preforms. When a foamable material is inserted between partial preforms, a foamable material may be arranged on the surface of a partial preform on a die (that is, the surface in contact with the outside air) along the shape of the partial preform. Namely, when a foamable film is used, the foamable film may be formed into a preshape in advance that corresponds to the shape of partial preforms or groups of partial preforms placed on a die. Alternatively, if a foamable resin is coated, the foamable resin may be coated on the entire surface of a partial preform or a group of partial preforms on a die. Yet alternatively, if a foamable resin mass is used, the mass may be placed on an appropriate spot (or multiple spots) and spread on the entire surface of a partial preform or a group of partial preforms on a die by using the aforementioned method. A foamable film may be arranged on a surface of a partial preform before it is combined with another partial preform or on a surface of a group of partial preforms obtained by combining multiple partial preforms.

In an embodiment of the present invention, when end faces of multiple partial preforms are set to abut each other, a foamable material may be arranged only on the abutting portion and its vicinity. When edges of multiple partial preforms overlap, a foamable material may be arranged only on the overlapping portion and its vicinity. Here, "vicinity" means at or within 10 mm of a portion where end faces of multiple partial preforms abut each other, or a portion where edges of multiple partial preforms overlap.

Moreover, in an embodiment of the present invention, when edges of multiple partial preforms overlap, those edges may be combined and overlapped by a foamable material placed between the edges. When a foamable film is used, the film is preferred to be cut into the same shape and dimensions as those of a portion to be overlapped and then to be inserted into the overlapping portion. As described, edges of partial preforms are preferred to overlap each other with a foamable film placed between them so as to reduce the amount of a foamable film necessary to fill the gaps between partial preforms. Also, when a foamable resin is coated, the foamable resin is preferred to be coated only on the overlapping portion and its vicinity so as to reduce the amount of foamable resin needed to fill the gaps between partial preforms. Furthermore, when a foamable resin mass is used, the foamable resin mass is preferred to be arranged so as to spread only on the abutting portion and its vicinity, or only on the overlapping portion and its vicinity, in order to reduce the amount of foamable resin needed to fill the gaps between partial preforms.

In an embodiment of the present invention, by combining a foamable material and partial preforms or groups of partial preforms, even when a slight gap occurs between adjacent or overlapping partial preforms, the foamable material will foam up to fill the gap while the preform is compression-molded. Accordingly, meandering of reinforcing fibers and occurrence of voids are prevented.

In addition, when a preform with varied thicknesses is compression-molded, even if varied thicknesses of the prepreg cause mismatching between the preform thickness and clearance of the die, the foamable material foams up and fills the difference between the thickness of the preform and the clearance of the die. Accordingly, molding failure is prevented, and consistent quality of the fiber-reinforced composite material molding is maintained.

Regarding a method for forming a preform by integrating partial preforms after they are combined with a foamable material placed therein, it is an option to arrange manually all the partial preforms and integrate them; it is another option to arrange all the partial preforms on a die on which a rubber film or the like is placed, and to evacuate the inner air so that the rubber film adheres to the die with partial preforms placed therein; it is yet another option to arrange male and female dies on a simple molding machine, place all the partial preforms on either die and then set the other die to cover the die so that partial preforms are compressed by the male and female dies. Since it is easier to remove the air from between partial preforms, it is preferred to employ a method for evacuating the inner air of a mold so that a rubber film adheres to the die with partial preforms placed therein.

Here, to integrate means multiple partial preforms and foamable material, which are combined to form the same three-dimensional shape as that of the target fiber-reinforced composite material molding, are made into one entity to a degree that enables a compression-molding process in step (C). When integrated multiple partial preforms and foamable material are transferred to step (C), they are preferred to be in one entity so as not to cause partial preforms and foamable material to be shifted.

[Step (C)]

In step (C), a preform produced in step (B) above is placed in a die where a clearance is set to correspond to the thickness of the preform, and heat and pressure are applied on the preform by using a pressing machine under conditions of desired temperature and pressure so that the preform is cured to obtain an intended molded product of a target fiber-reinforced composite material.

During the above procedure, the die is set at a desired temperature. After the compression-molding process is conducted, the molded product is preferred to be removed while the temperature is maintained. Accordingly, it is not necessary to raise or lower the temperature of the die, thereby shortening the molding cycle. As a result, productivity is enhanced.

<Fiber-Reinforced Composite Material Molding>

Another aspect of the present invention is a fiber-reinforced composite material molding obtained by the aforementioned method for manufacturing a fiber-reinforced composite material molding. The fiber-reinforced composite material molding related to the present invention is characterized by a foamed body arranged at least in a portion between multiple partial preforms. Here, as described earlier, a "foamed body" means a portion corresponding to the foamable material, formed when a foaming agent contained in a foamable resin in the foamable material foams up during the heat compression process to cure the preform.

As described, when a foamed body is arranged in at least a portion between multiple partial preforms, a fiber-reinforced composite material molding related to the present invention exhibits stable physical properties since meandering reinforcing fibers and occurrence of voids are prevented in the molded product.

EXAMPLES

In the following, the present invention is described in detail with reference to examples. However, the present invention is not limited to the examples below.

Example 1

The present example describes a method for manufacturing a fiber-reinforced composite material molding so that molded product 1 having a shape shown in FIG. 1 is obtained.

Figure 2:
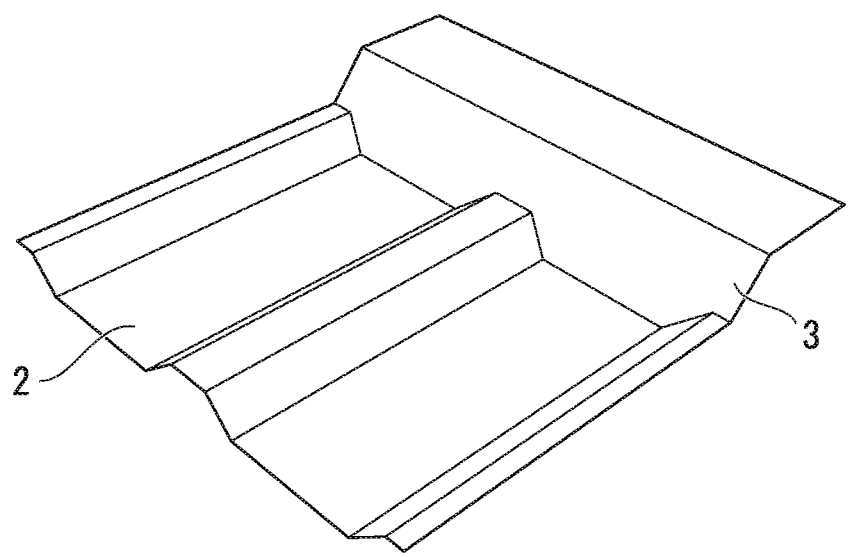
FIG. 2 is a perspective view showing a partial shape of the molded product according to the embodiment of the present invention.
Figure 3:
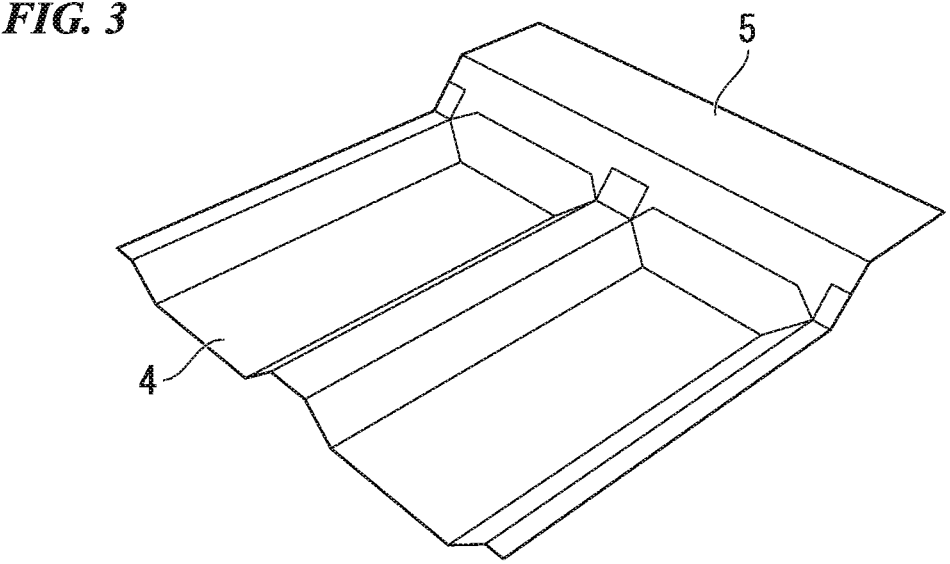
FIG. 3 is a perspective view showing a partial shape of the molded product according to the embodiment of the present invention.

First, the shape of molded product 1 was divided into partial shapes 2, 3 as shown in FIG. 2, and was also divided into partial shapes 4, 5 as shown in FIG. 3. Each set is a group of partial shapes.

Dividing lines obtained from partial shapes 2, 3 are set so as not to align on the same dividing lines obtained from partial shapes 4, 5.

Then, from three-dimensional CAD data of molded product 1, three-dimensional CAD data of partial shapes 2, 3, 4, 5 were extracted.

Figure 4:
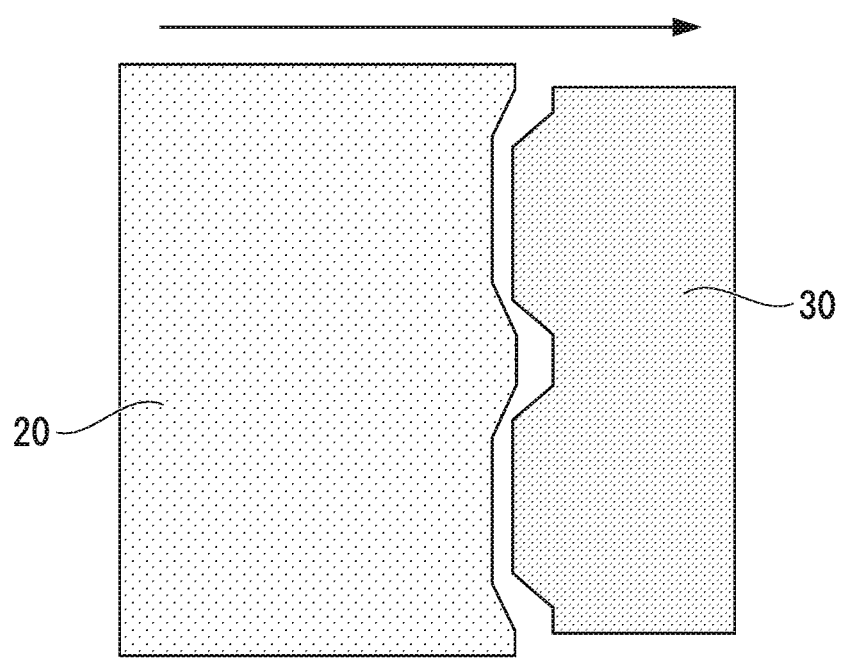
FIG. 4 is a plan view showing a planar shape according to the embodiment of the present invention.
Figure 5:
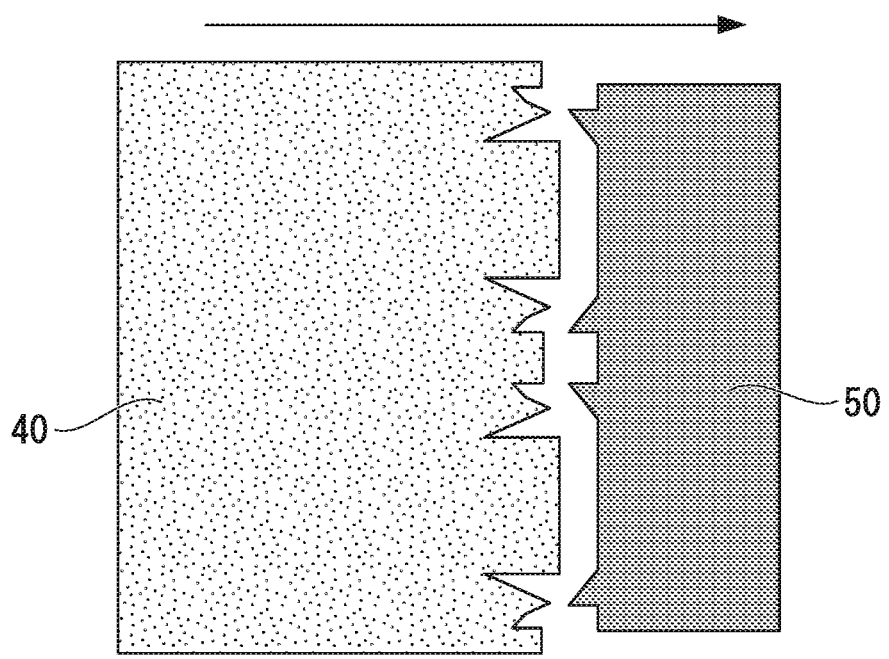
FIG. 5 is a plan view showing a planar shape according to the embodiment of the present invention.

Next, as shown in FIGS. 4 and 5, a planar shape creating software (product name: FiberSim, made by Siemens PLM Software) was used to prepare planar shape 20 from three-dimensional CAD data of partial shape 2. In the same manner, planar shape 30 from partial shape 3, planar shape 40 from partial shape 4 and planar shape 50 from partial shape 5 were each prepared.

Next prepared was a prepreg sheet formed by impregnating an epoxy resin composition into unidirectional carbon fibers (product name: TR391E250S, made by Mitsubishi Rayon Co., Ltd., thickness per sheet: 0.22 mm).

Using a cutting plotter, three pieces were cut from the prepreg sheet to have the same shape as that of planar shape 20 in such a way that the carbon fiber orientation corresponds to the arrow direction in FIG. 4; namely, the orientation angle of carbon fibers is set to be zero degrees. Moreover, two more pieces were cut to have the same shape as that of planar shape 20 in such a way that the carbon fiber orientation crosses orthogonally with the arrow direction in FIG. 4, namely, the orientation angle of carbon fibers is set to be 90 degrees.

Then, laminate 6 was formed by laminating cut prepreg pieces so as to align carbon fibers at orientation angles of 0°/90°/0°/90°/0°.

Next, to preshape laminate 6 having the shape of planar shape 20 as shown in FIG. 6A into partial shape 2, a male/female die (female die 7, male die 8) and molding machine 9 to operate the die were prepared, and female die 7 and male die 8 were set into molding machine 9. Here, a "female die" and a "male die" mean a pair of dies where the convex or concave portion of a die is set to correspond to the concave or convex portion of another die. In the present application, female die 7 was set as a movable die positioned above laminate 6, and male die 8 was set below as a fixed die.

Next, as shown in FIG. 6B, after laminate 6 was positioned on male die 8, infrared heater 10 was used to apply heat so that the surface temperature of laminate 6 was raised to be approximately 60° C. After heat was applied, female die 7 was lowered to close the male/female die as shown in FIG. 6C so that laminate 6 was formed into a preshape.

Next, after air was blown onto the male/female die to cool laminate 6, female die 7 was elevated, and partial preform 21 preshaped into partial shape 2 was removed from male die 8 as shown in FIG. 6D.

In addition, the same procedure as above was conducted on partial shapes 3, 4, 5 so as to obtain partial preforms 31, 41, 51. Among them, preforms 21, 31 make up a group of partial preforms, and preforms 41, 51 make up another group of partial preforms.

Next, a foamable epoxy resin composition set to foam up at a predetermined expansion foaming ratio at a predetermined temperature (HAP-0, made by Nagase ChemteX Corporation) was prepared to have a temperature of 30° C. and was coated by using a coater to form a foamable film with a thickness of 0.5 mm.

Then, preform die 11 having the shape of molded product 1 was prepared, and the foamable film was placed thereon and was manually preshaped so as to form the same shape as that of preform die 11. Accordingly, foamable film 12 with a desired shape was obtained.

Since a foamable film is significantly soft, it was easy to form the film into a desired preshape.

Next, preform die 11 was prepared as shown in FIG. 7A, and partial preforms 21, 31 were arranged thereon. At that time, since it was assumed that there are variations when partial preforms are combined, partial preforms 21, 31 were intentionally arranged to have an approximate space of 5 mm.

The preshaped foamable film 12 was placed on partial preforms 21, 31, and partial preforms 41, 51 were further placed on the film. At that time, partial preforms were arranged so as not to cause significant overlap or gaps between adjacent partial preforms.

Then, a rubber film was arranged on the preforms, and the rubber film was adhered to the preforms when the inner air was evacuated. Accordingly, partial preforms were integrated and preform 60 was obtained as shown in FIG. 7B.

Figure 8:
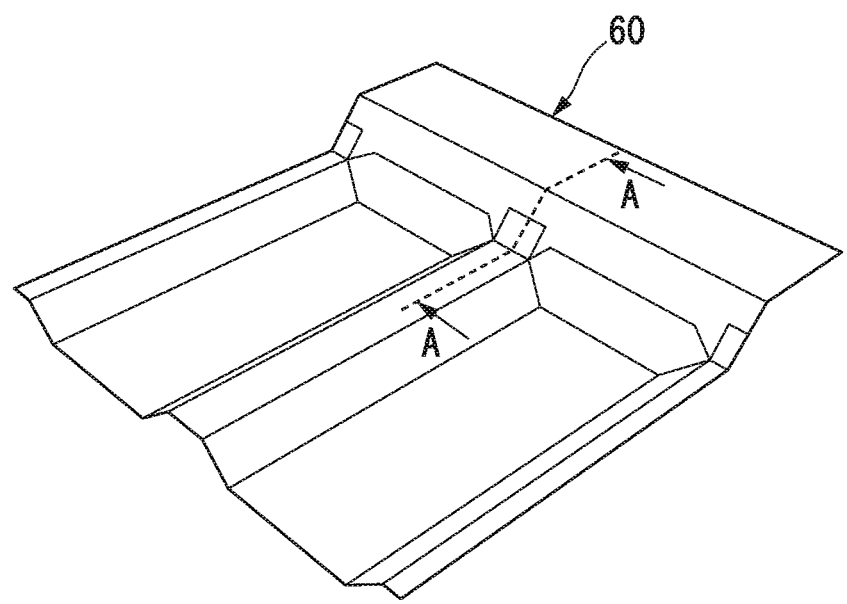
FIG. 8 is view showing the shape of a preform according to the embodiment of the present invention.
Figure 9:
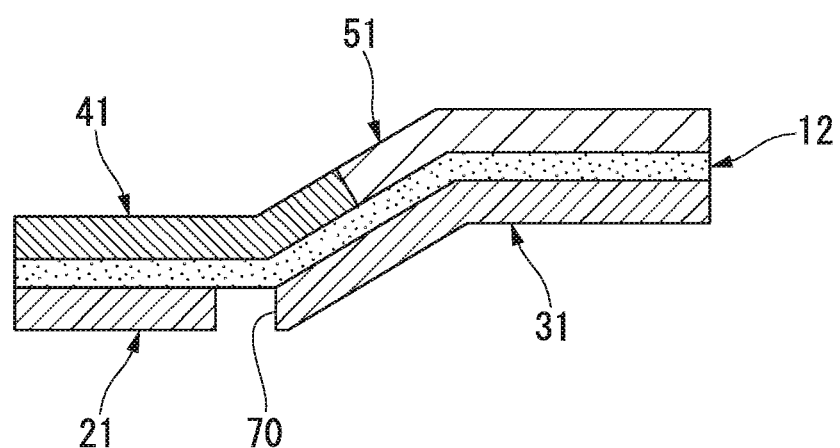
FIG. 9 is a cross-sectional view obtained when the preform in FIG. 8 is cut along the A-A line.

FIG. 8 is a perspective view of a preform according to the present example. FIG. 9 is a cross-sectional view obtained when the preform in FIG. 8 is cut along the A-A line.

Then, a molding die with clearance set to match the thickness of preform 60 was prepared and heated to 140° C. After that, preform 60 was placed on the lower die of the molding die, and then the upper die was clamped to the lower die, maintaining that position for 10 minutes during a heat-compression process. Accordingly, fiber-reinforced resin molded product was obtained.

Since the foamable film foamed up during the molding process and foamed body 13 filled space 70 formed in advance between partial preforms 21, 31, no meandering of reinforcing fibers or voids were observed in the molded product.

Figure 10:
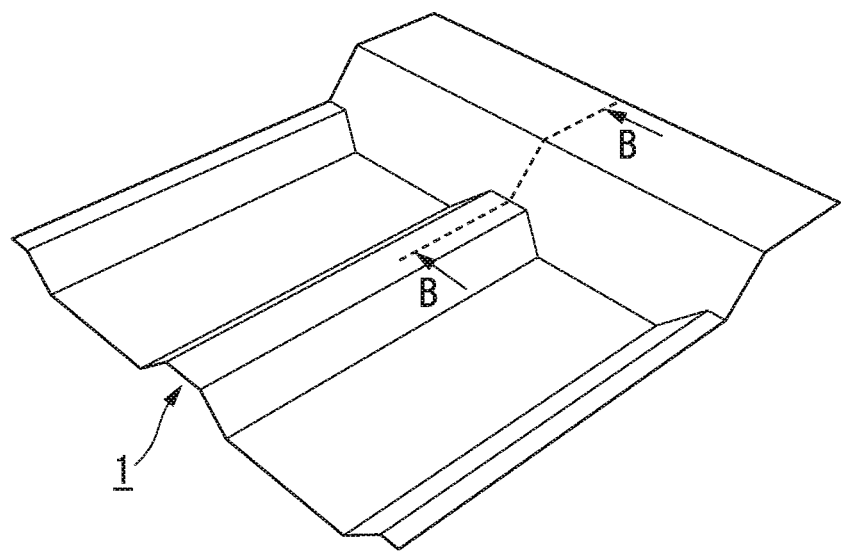
FIG. 10 is a perspective view of the molded product according to the embodiment of the present invention.
Figure 11:
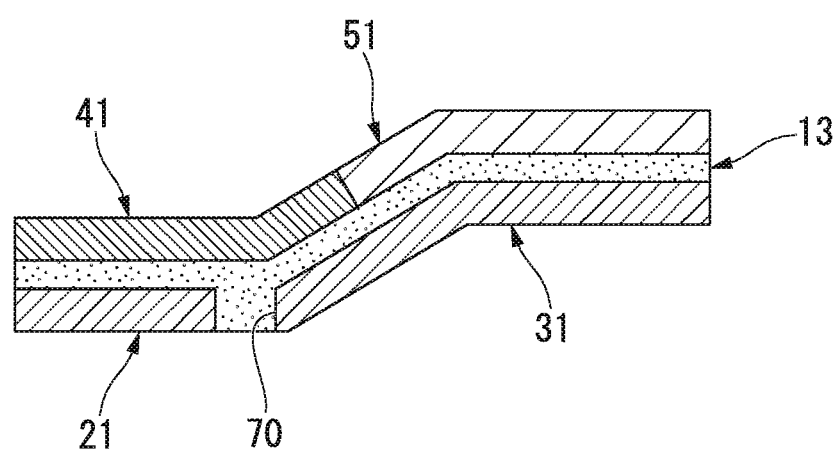
FIG. 11 is a cross-sectional view obtained when the molded product in FIG. 10 is cut along the B-B line.

FIG. 10 shows a perspective view of a molded product related to the present example. In addition, FIG. 11 shows a cross-sectional view obtained when the molded product in FIG. 10 was cut along the B-B line.

Example 2-1

Figure 12:
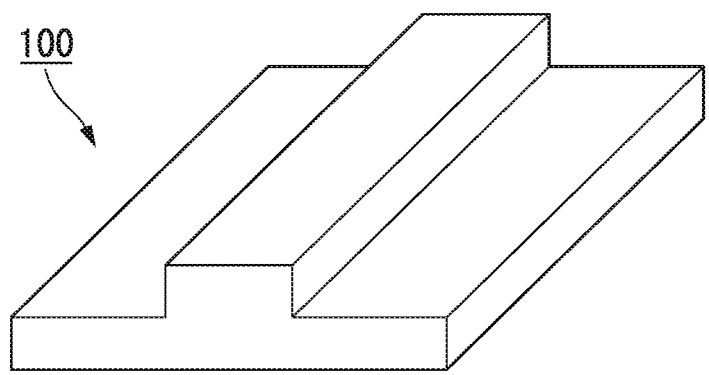
FIG. 12 is a perspective view of a molded product according to another embodiment of the present invention.

The present example describes a method for manufacturing a fiber-reinforced composite material molding to form molded product 100 having varied thicknesses as shown in FIG. 12.

First, the shape of molded product 100 is divided into partial shapes. Then, partial preforms 200, 300, 400, 500 corresponding to the divided shapes as well as foamable film 600 with a desired shape were formed.

The prepreg sheet, the laminated structure and the method for forming partial preforms were the same as those in Example 1. In addition, the foamable epoxy resin composition used here and methods for forming and preshaping a foamable film were the same as those in Example 1.

Figure 13:
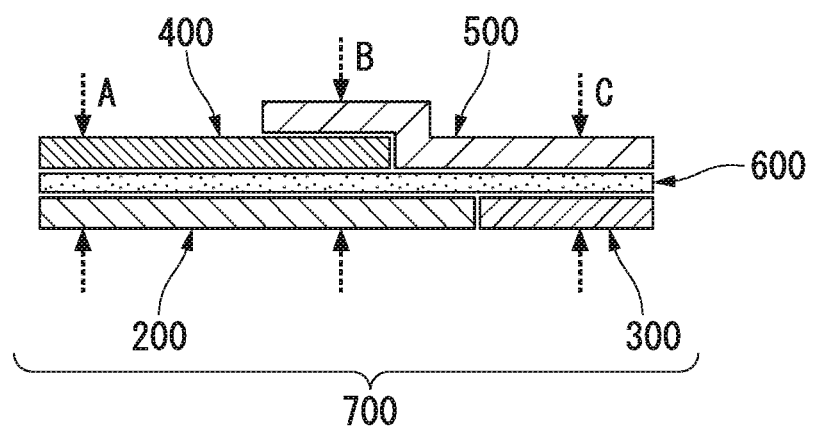
FIG. 13 is a cross-sectional view in the other embodiment of the present invention.

The above-prepared partial preforms and foamable film with a desired shape were combined so that preform 700 was formed to have a cross-sectional structure as shown in FIG. 13. The same method as in Example 1 was employed for integrating partial preforms and foamable film.

In addition, Table 1 shows the thickness of each portion of preform 700 shown in FIG. 13.

Figure 14:
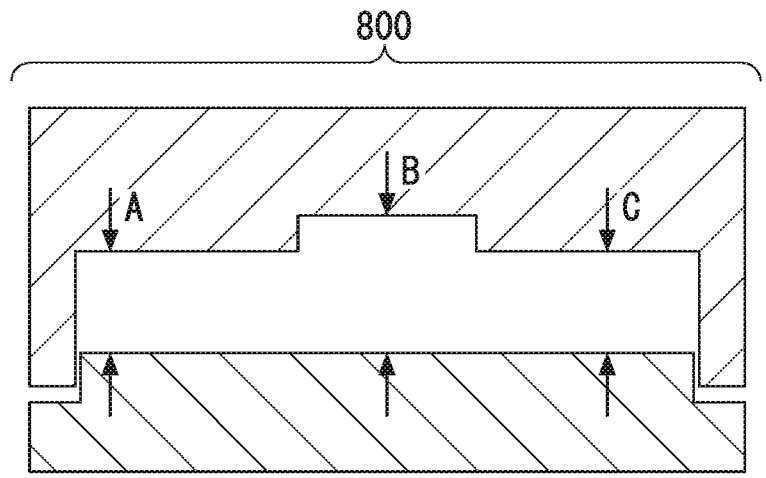
FIG. 14 is a cross-sectional view in the other embodiment of the present invention.
Figure 15:
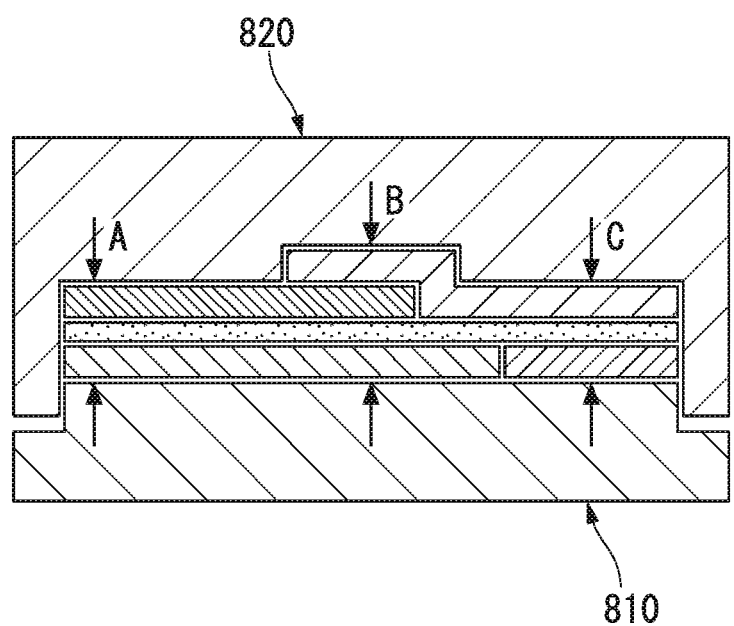
FIG. 15 is a cross-sectional view in the other embodiment of the present invention.

Then, molding die 800 was prepared to have a cross-sectional structure as shown in FIG. 14 and clearances in a thickness direction shown in Table 1. After the die was heated to 140° C., preform 700 was placed on lower die 810, which was clamped with upper die 820, maintaining that position for 10 minutes during a heat-compression process as shown in FIG. 15. Accordingly, a fiber-reinforced resin molded product was obtained. No meandering of reinforcing fibers or occurrence of voids was observed in the molded product.

Table 1 shows the thickness of each portion of the molded product and each clearance of the die during molding procedures.

In Table 1, spots A and C for measuring the thickness are each set to be 25 mm from each end face of preforms, while spot B for measuring the thickness is set to be the center position of overlapping partial preforms.

The thickness of a preform is the value obtained when the thickness at each measuring spot of the preform is measured by using an outside micrometer having a 6.35φ measuring face and a spindle with a 0.5 mm pitch. The thickness of a molded product is the value obtained when the thickness at each measuring spot of the molded product is measured by using an outside micrometer the same as above.

The thickness of a prepreg portion of a preform is the total value obtained by adding the thicknesses of partial preforms at measuring spot A, B or C using an outside micrometer the same as above. The thickness of a foamable film portion is the value obtained when the foamable film prior to being arranged between partial preforms is measured by a paper micrometer having a 14.3φ measuring face and a straight spindle equipped with a device for applying a constant pressure of 8.02±08N (PPM-25, made by Mitutoyo Corporation).

In addition, the thickness of a prepreg portion of a molded product is the value obtained when the thickness of a reference molded product is measured by using the same outside micrometer; such a reference molded product is formed when partial preforms, formed by using the prepreg of the same lot as that used in examples and comparative examples, are combined and compression-molded to make a preform without using a foamable film. The thickness of a foamed body is the value obtained by subtracting the thickness of the prepreg portion in a molded product from the thickness of the molded product.

Example 2-2

A fiber-reinforced resin molded product was obtained by employing the same method as that in Example 2-1 except for using a prepreg sheet with a thickness of 0.20 mm per sheet; such a prepreg was produced by reducing the amounts of carbon fibers and epoxy resin composition in the prepreg based on an assumption of variations that may occur when prepreg is produced.

Figure 16:
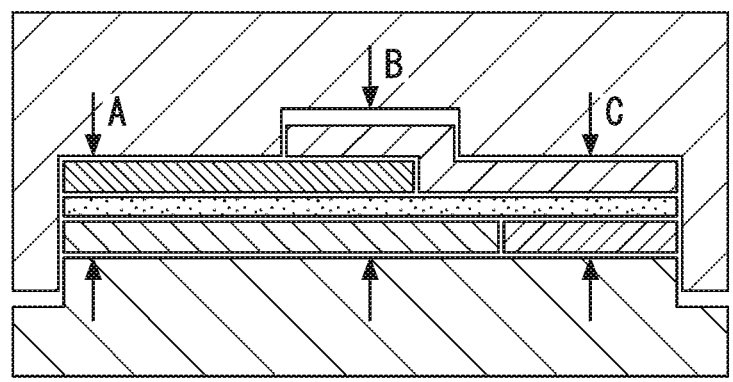
FIG. 16 is a cross-sectional view in yet another embodiment of the present invention.
Figure 17:
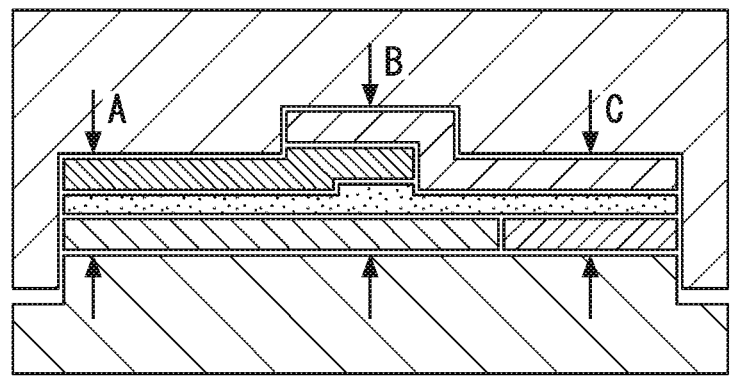
FIG. 17 is a cross-sectional view in yet the other embodiment of the present invention.

FIG. 16 is a cross-sectional view showing the molding die and the preform shortly after the molding die was closed, and FIG. 17 is a cross-sectional view showing the molding die and the molded product shortly before the molding die was opened. Table 1 shows the thickness at each spot of the preform, the thickness at each spot of the molded product and the clearance of the die during molding.

As shown in FIG. 17 and Table 1, the foamable film foamed up during molding, and the thickness of the preform was matched with the clearance of the die. Accordingly, a molded product was obtained without exhibiting meandering of reinforcing fibers or occurrence of voids even with the variation in the prepreg thickness. The foaming expansion ratio of foamable film was 1.4.

Example 3-1

Figure 18:
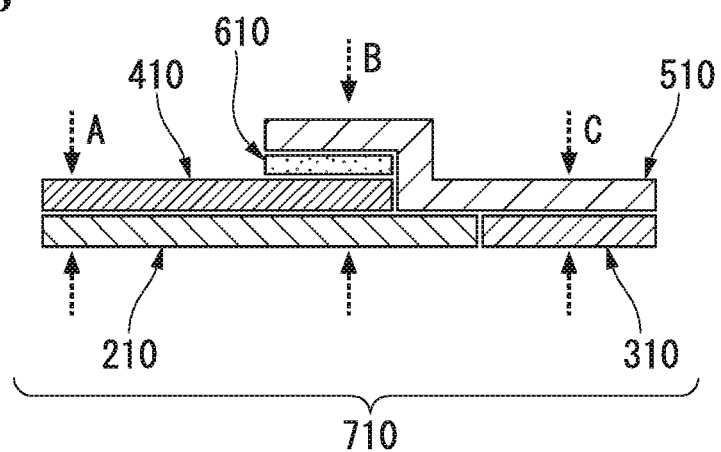
FIG. 18 is a cross-sectional view in yet another embodiment of the present invention.

A fiber-reinforced composite material molding was obtained by employing the same method as that in Example 2-1 except that clearances of the molding die in a thickness direction were changed as shown in Table 1, and preform 710 to be put in the molding die was produced by combining partial preforms 210, 310, 410, 510 and foamable film 610 with a desired shape as shown in FIG. 18 to have thicknesses as shown in Table 1. No meandering of reinforcing fibers or occurrence of voids was observed in the molded product.

Figure 19:
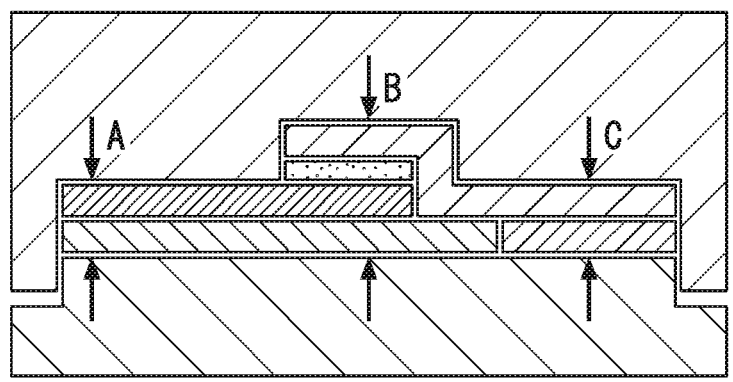
FIG. 19 is a cross-sectional view in yet the other embodiment of the present invention.

FIG. 19 is a cross-sectional view showing the molding die and the preform shortly before the molding die was opened. Table 1 shows the thickness at each spot of the molded product and the clearance of the die during molding.

Example 3-2

A fiber-reinforced resin molded product was obtained by employing the same method as that in Example 3-1 except for using a prepreg sheet with a thickness of 0.20 mm per sheet; such a prepreg was produced by reducing the amounts of carbon fibers and epoxy resin composition in the prepreg based on an assumption of variations that may occur when prepreg is produced.

Figure 20:
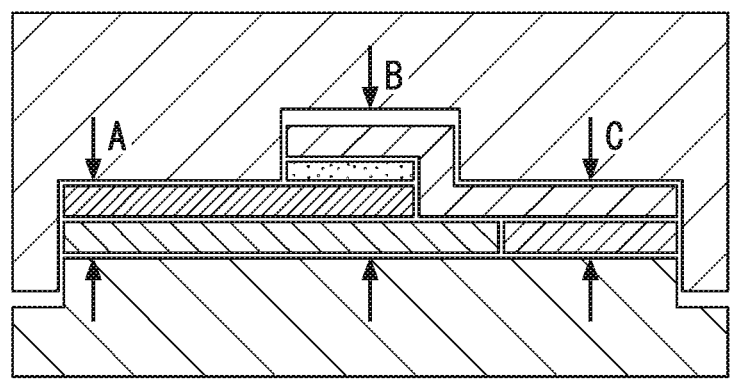
FIG. 20 is a cross-sectional view in yet another embodiment of the present invention.
Figure 21:
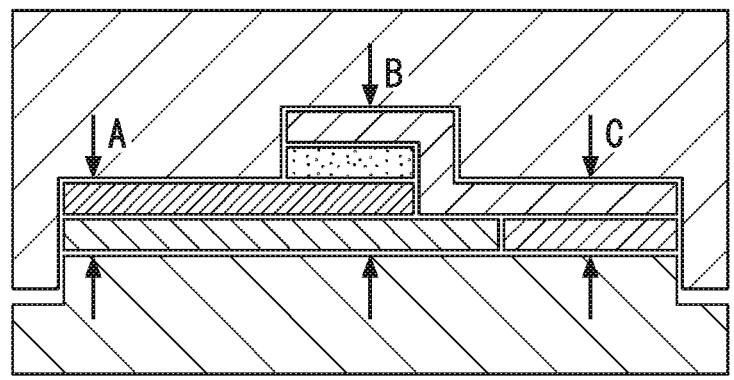
FIG. 21 is a cross-sectional view in yet the other embodiment of the present invention.

FIG. 20 is a cross-sectional view showing the molding die and the preform shortly after the molding die was closed, and FIG. 21 is a cross-sectional view showing the molding die and the molded product shortly before the molding die was opened. Table 1 shows the thickness at each spot of the preform, the thickness at each spot of the molded product and the clearance of the die during molding.

As shown in FIG. 21 and Table 1, the foamable film foamed up during molding procedures, and the thickness of the preform was matched with the clearance of the die. Accordingly, a molded product was obtained without exhibiting meandering of reinforcing fibers or occurrence of voids even with the variation in the prepreg thickness. The foaming expansion ratio of foamable film in a thickness direction was 1.4.

Comparative Example 1

A fiber-reinforced resin molded product was obtained by employing the same method as in Example 1 except that foamable film 12 was not used. In the molded product, reinforcing fibers meandered significantly and many voids were observed in space 70 formed in advance between partial preforms 21, 31.

Comparative Example 2-1

Figure 22:
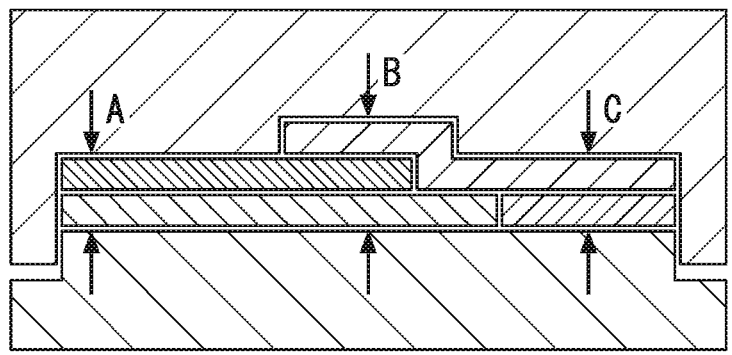
FIG. 22 is a cross-sectional view in an embodiment of a conventional technology.

A fiber-reinforced resin molded product was obtained by employing the same method as in Example 2-1 except that clearances of the compression molding die in a thickness direction were changed to those shown in Table 1 and foamable film 600 was not used. A molded product was obtained without exhibiting meandering of reinforcing fibers or occurrence of voids (FIG. 22).

Comparative Example 2-2

A fiber-reinforced resin molded product was obtained by employing the same method as in Comparative Example 2-1 except for using a prepreg sheet the same as that used in Example 3-2 based on an assumption of variations that may occur when prepreg is produced. As a result, meandering reinforcing fibers and voids were observed in portions of the molded product where thicknesses varied.

Figure 23:
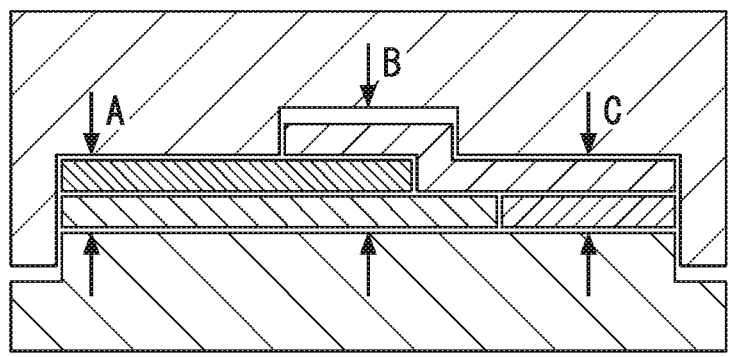
FIG. 23 is a cross-sectional view in another embodiment of a conventional technology.

When a fiber-reinforced resin molded product was molded from the preform without using a foamable film, if the thicknesses of prepregs varied, the thickness of the preform did not correspond to the clearances of the die, and molding defects were partially observed accordingly (FIG. 23).

TABLE 1

|  |  | Example 2-1 thickness at measuring spot | | | Examples 2-2 thickness at measuring spot | | | Example 3-1 thickness at measuring spot | | | Example 3-2 thickness at measuring spot | | | Comp. Example 2-1 thickness at measuring spot | | | Comp. Example 2-2 thickness at measuring spot | | |
|---|---|---|---|---|---|---|---|---|---|---|---|---|---|---|---|---|---|---|---|
|  |  | A | B | C | A | B | C | A | B | C | A | B | C | A | B | C | A | B | C |
| Clearance set in die | mm | 2.7 | 4.9 | 2.7 | 2.7 | 4.9 | 2.7 | 2.2 | 4.9 | 2.2 | 2.2 | 4.9 | 2.2 | 2.2 | 4.4 | 2.2 | 2.2 | 4.4 | 2.2 |
| Preform thickness of prepreg portion | mm | 2.2 | 4.4 | 2.2 | 2.0 | 4.0 | 2.0 | 2.2 | 4.4 | 2.2 | 2.0 | 4.0 | 2.0 | 2.2 | 4.4 | 2.2 | 2.0 | 4.0 | 2.0 |
| thickness of foamable film portion | mm | 0.5 | 0.5 | 0.5 | 0.5 | 0.5 | 0.5 | — | 0.5 | — | — | 0.5 | — | — | — | — | — | — | — |
| thickness of preform | mm | 2.7 | 4.9 | 2.7 | 2.5 | 4.5 | 2.5 | 2.2 | 4.9 | 2.2 | 2.0 | 4.5 | 2.0 | 2.2 | 4.4 | 2.2 | 2.0 | 4.0 | 2.0 |
| Molded product thickness of prepreg portion | mm | 2.2 | 4.4 | 2.2 | 2.0 | 4.0 | 2.0 | 2.2 | 4.4 | 2.2 | 2.0 | 4.0 | 2.0 | 2.2 | 4.4 | 2.2 | 2.0 | 4.0 | 2.0 |
| thickness of foamed body | mm | 0.5 | 0.5 | 0.5 | 0.5 | 0.7 | 0.5 | — | 0.5 | — | — | 0.7 | — | — | — | — | — | — | — |
| thickness of molded product | mm | 2.7 | 4.9 | 2.7 | 2.5 | 4.7 | 2.5 | 2.2 | 4.9 | 2.2 | 2.0 | 4.7 | 2.0 | 2.2 | 4.4 | 2.2 | 2.0 | 4.0 | 2.0 |
| Clearance in die during molding | mm | 2.7 | 4.9 | 2.7 | 2.5 | 4.7 | 2.5 | 2.7 | 4.9 | 2.7 | 2.5 | 4.7 | 2.5 | 2.2 | 4.4 | 2.2 | 2.0 | 4.2 | 2.0 |
| Molding result |  | excellent without reinforcing fiber meandering or void | | | excellent without reinforcing fiber meandering or void | | | excellent without reinforcing fiber meandering or void | | | excellent without reinforcing fiber meandering or void | | | excellent without reinforcing fiber meandering or void | | | reinforcing fiber meandering and void occurred at B | | |

DESCRIPTION OF NUMERICAL REFERENCES 1 molded product
2 partial shape
3 partial shape
4 partial shape
5 partial shape
6 cut-out piece or laminate of prepreg
7 female die
8 male die
9 molding machine
10 infrared heater
11 preform die
12 foamable film
13 foamed body
20 planar shape
30 planar shape
40 planar shape
50 planar shape
21 partial preform
31 partial preform
41 partial preform
51 partial preform
60 preform
70 space
100 molded product
200 partial preform
210 partial preform
300 partial preform
310 partial preform
400 partial preform
410 partial preform
500 partial preform
510 partial preform
600 foamable film
610 foamable film
700 preform
710 preform
800 molding die
810 lower die
820 upper die

The invention claimed is:

1. A method for manufacturing a fiber-reinforced composite material molding, comprising:
a step (A) for forming a plurality of partial preforms, each having a partial shape obtained by dividing the three-dimensional shape of a target fiber-reinforced composite material molding, by cutting a prepreg sheet containing reinforcing fibers and a matrix resin composition, and by preshaping the cut prepreg pieces;
a step (B) for forming a preform having the three-dimensional shape of the target fiber-reinforced composite material molding by combining and integrating the plurality of partial preforms; and
a step (C) for producing a fiber-reinforced composite material molding by compression-molding the preform,
wherein the step (B) includes arranging a foamable material between the partial preforms only at an abutting or overlapping portion thereof and its vicinity when they are combined; and
wherein the foamable material is a foamable resin film comprising an epoxy resin composition of which epoxy resin content is 50 mass % or greater relative to the total mass of the epoxy resin composition.

2. The method for manufacturing a fiber-reinforced composite material molding according to claim 1, wherein each of the plurality of the partial preforms is obtained by layering a plurality of pieces of the cut prepreg to form a laminate and by preshaping the laminate.

3. The method for manufacturing a fiber-reinforced composite material molding according to claim 1, wherein the step (B) includes a step for combining the partial preforms by setting their end faces to abut each other.

4. The method for manufacturing a fiber-reinforced composite material molding according to claim 1, wherein the step (B) includes a step for combining the partial preforms by setting their edges to overlap.

5. The method for manufacturing a fiber-reinforced composite material molding according to claim 4, wherein the step (B) includes a step for combining the partial preforms by setting their edges to overlap each other with the foamable material placed in between.

6. The method for manufacturing a fiber-reinforced composite material molding according to claim 1, wherein the foamable resin film has properties to foam up when heated.

7. The method for manufacturing a fiber-reinforced composite material molding according to claim 1, wherein the foamable resin film has properties to foam up through chemical reactions.

8. The method for manufacturing a fiber-reinforced composite material molding according to claim 1, wherein the thickness of the foamable resin film is 0.01 to 10.0 mm.

9. The method for manufacturing a fiber-reinforced composite material molding according to claim 8, wherein the thickness of the foamable resin film is 0.2 to 5.0 mm.

10. The method for manufacturing a fiber-reinforced composite material molding according to claim 1, wherein the plurality of partial preforms contain a plurality of groups of partial preforms, and the plurality of groups of partial preforms are those divided by different dividing-line patterns.

11. The method for manufacturing a fiber-reinforced composite material molding according to claim 1, wherein the reinforce fibers are carbon fibers.

12. The method for manufacturing a fiber-reinforced composite material molding according to claim 1, wherein the matrix resin composition is an epoxy resin composition.

* * * * *